United States Patent [19]
Gumkowski et al.

[11] 4,448,289
[45] May 15, 1984

[54] DISC BRAKE ASSEMBLY

[75] Inventors: Bert A. Gumkowski; Peter J. Schreiner, both of South Bend, Ind.

[73] Assignee: The Bendix Corporation, Southfield, Mich.

[21] Appl. No.: 392,057

[22] Filed: Jun. 25, 1982

[51] Int. Cl.³ .............................................. F16D 65/02
[52] U.S. Cl. ............................. 188/73.45; 188/73.31
[58] Field of Search .............. 188/73.31, 73.32, 73.35, 188/73.38, 73.44, 73.45

[56] References Cited

U.S. PATENT DOCUMENTS

| | | | |
|---|---|---|---|
| 4,310,075 | 1/1982 | Johannesen et al. | 188/73.45 |
| 4,310,076 | 1/1982 | Ikeda | 188/73.35 |
| 4,393,963 | 7/1983 | Oltmanns et al. | 188/73.45 |

Primary Examiner—Duane A. Reger
Attorney, Agent, or Firm—Paul David Schoenle; Ken C. Decker

[57] ABSTRACT

A disc brake assembly includes a caliper assembly and a torque member with matching recesses for receiving a pin assembly and the pin assembly includes as an assembled part thereof, a wire element carried by a resilient member to permit installation of the pin assembly into the recesses and yieldably prevent withdrawal thereof.

5 Claims, 5 Drawing Figures

U.S. Patent     May 15, 1984     4,448,289
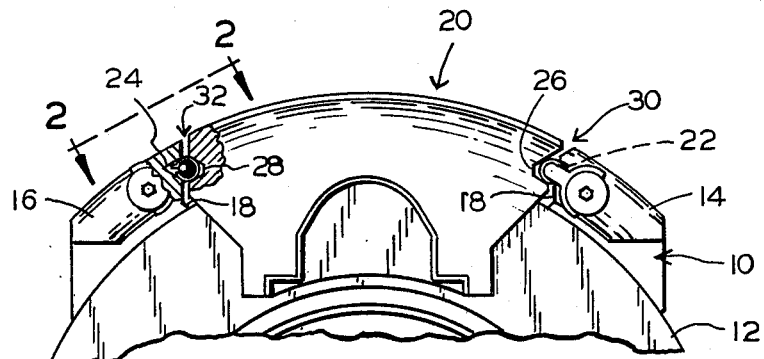
Fig. 1
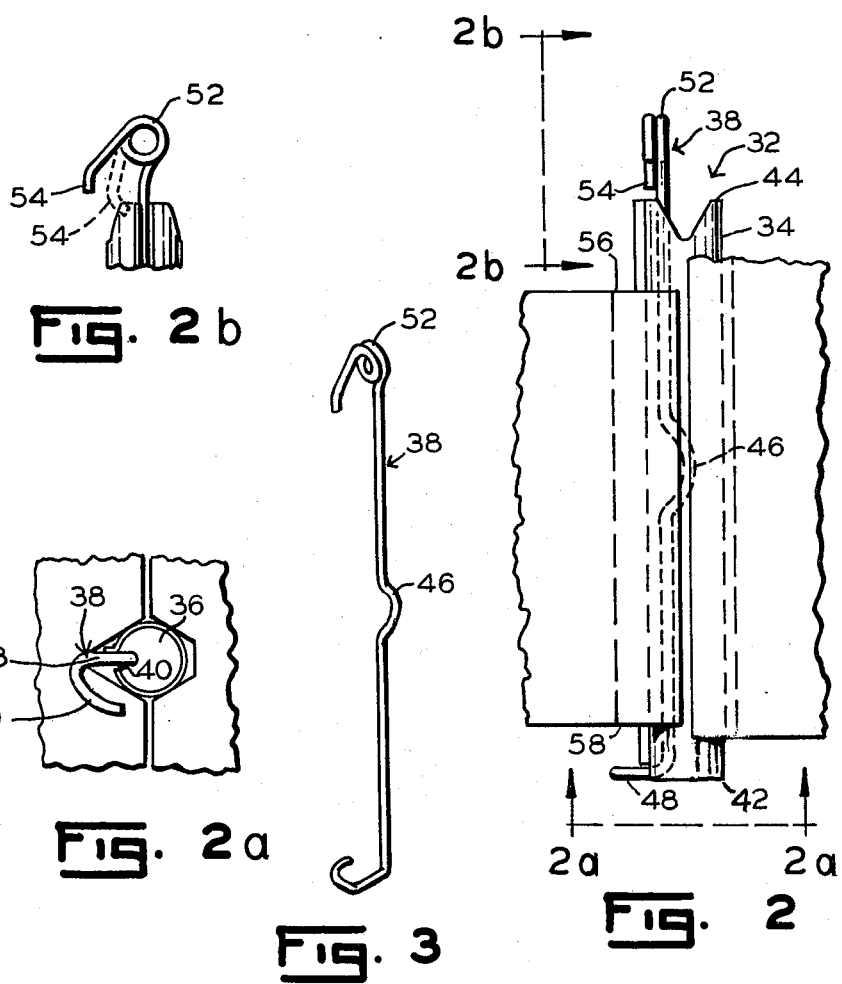
Fig. 2b
Fig. 2a
Fig. 3
Fig. 2

DISC BRAKE ASSEMBLY

This invention relates to a disc brake assembly, and, more particularly, to a rail slider disc brake wherein a pair of pin assemblies are disposed in matching recesses between a caliper and a torque member.

A disc brake assembly comprising a torque member with a pair of circumferentially spaced arms defining an opening therebetween to receive a caliper assembly, one of the arms cooperating with the caliper assembly to define substantially matching axially extending recesses, and a pin assembly disposed within the recesses, to slidably mount the caliper assembly relative to the torque member, the pin assembly comprising a cylindrical part defining an axially extending bore and engageable with the walls of the caliper and torque member recesses and a resilient member disposed within the cylindrical part bore to yieldably oppose radial contraction of the cylindrical part, and the pin assembly further including means to prevent withdrawal of the pin assembly from the matching axially extending recesses.

In U.S. application Ser. No. 191,188, a pin assembly is disclosed with a metal cylinder engageable with a caliper assembly and a torque member. The metal cylinder forms a bore for receiving a resilient member such that the metal cylinder is contracted radially in response to movement of the caliper in the direction of the pin assembly in order to compress the resilient material.

The pin assembly includes a flange extending from one end of the metal cylinder. The flange is secured to the torque member to prevent separation of the pin assembly from the caliper assembly and torque member. In view of the vibration imparted to the disc brake assembly during operation of an associated vehicle, it is possible for the flange to free itself from the attachment to the torque member. If the flange is freed from the torque member, the pin assembly can withdraw from its desired position to render the disc brake assembly inoperative.

The disc brake assembly is characterized by said pin assembly means comprising a wire element extending outwardly from said resilient member to define opposite ends for said wire element, one of said wire element ends defining a flexible latch to permit said pin assembly to be inserted into said recesses, said flexible latch being deformable to fit within said recesses when said pin assembly is inserted into said recesses and said flexible latch returning to its free state when said pin assembly is disposed in its operative position within said recesses whereby both of said wire element ends cooperate with either said caliper assembly or said torque member to prevent withdrawal of said pin assembly from said recesses.

It is an advantage of the present invention that a simple wire element is designed to prevent withdrawal of a pin assembly from its desired position in the absence of a required attachment to the torque member and calipher assembly. Also, the wire element is formed with stops at both ends to oppose separation in either direction along the longitudinal axis of the pin assembly.

FIG. 1 shows a partial view of a disc brake assembly;
FIG. 2 is a view taken along line 2—2 of FIG. 1;
FIG. 2a is a view taken along line a—a of FIG. 2;
FIG. 2b is a view taken along line b—b of FIG. 2; and
FIG. 3 is a view of the wire element separate from the pin assembly.

In FIG. 1 the disc brake assembly includes a torque member 10 fixedly disposed adjacent a rotor 12. The torque member 10 includes a pair of arms 14 and 16 extending axially over the periphery of the rotor to define a circumferentially extending opening 18 therebetween. A caliper assembly 20 is carried within the opening 18 to cooperate with a pair of friction elements in a well known manner to retard rotation of the rotor during braking. Each arm 14 and 16 includes recesses 22 and 24 opening in the direction of the caliper assembly 20 which is also provided with substantially matching recesses 26 and 28. In order to movably support the caliper assembly 20 relative to the torque member 10, the recesses 22 and 26 receive a pin assembly 30 and the recesses 24 and 28 receive a pin assembly 32. Each pin assembly is substantially the same, so that the description will proceed with reference to only pin assembly 32. The features for the pin assembly 32 are equally applicable to pin assembly 30.

Turning to FIGS. 2, 2a and 2b, the pin assembly 32 comprises a metal cylinder 34, a resilient member 36 and a wire element 38. The metal cylinder is split at 40 to permit slight radial contraction during braking in order to compress the resilient member 36 which extends from one end 42 of the metal cylinder 34 to the other end 44. The wire element 38 is provided with an intermediate bent portion 46 so that when the wire element is attached to the resilient member during molding of the latter, the wire element 38 will not rotate relative to the resilient member. The wire element 38 at the one end 42 is provided with a transverse leg portion 48 and an arcuate leg portion 50. The wire element 38 at the other end 44 is provided with a coiled portion 52 terminating in a finger 54 extending angularly toward the torque member 12 away from the coiled portion 52. The finger 54 opposes a face 56 on the torque member arm 16 and the portions 48 and 50 oppose an opposite face 58 relative to face 56. The finger in its free state forms a locking fit with the face 56 and in its deformed state, the finger is pivoted toward the longitudinal axis for the recesses to fit within the opening defined by the recesses.

The pin assembly 32 is preferably constructed as a one piece unit with the wire element 38 being retained in the molded elastomeric material for the resilient member 36 and the resilient member being retained within the metal cylinder 34. Consequently, during assembly the one piece unit for the pin assembly 32 is aligned with the recesses 24 and 28 when the caliper is positioned in the opening 18. Next, the pin assembly 32 is inserted into the recesses 24 and 28 such that the finger is deformed to pivot into alignment with the recess 24 so that the pin assembly will pass through the recesses until the finger passes the face 56 to return to its free state opposing the face 56. See FIG. 2b for the deformed position of the finger as shown in phantom. In the installed position the finger opposes face 56 and the portions 48 and 50 oppose the face 58 to prevent inadvertent withdrawal of the pin assembly from the recesses.

If the pin assembly moves to engage either finger 54 with face 56 or portions 48 and 50 with face 58, the finger yieldably opposes further movement toward face 58 and portion 48 is flexible to slightly extend into the recess 24, see FIG. 2a, to yieldably oppose further movement toward face 56.

The wire element 38 is offset within the resilient member 36 toward the torque member arm 16 in order to align its ends with the faces 56 and 58 on the arm 16.

There are many variations to the wire element 38 which would permit installation of the pin assembly 32 into the recesses 24 and 28 yet yieldably prevent withdrawal in response to vibration. As such these variations for the wire element 38 are included within the scope of the invention herein.

We claim:

1. A disc brake assembly comprising a torque member with a pair of circumferentially spaced arms defining an opening therebetween to receive a caliper assembly, one of the arms cooperating with the caliper assembly to define substantially matching axially extending recesses, and a pin assembly disposed within the recesses to slidably mount the caliper assembly relative to the torque member, the pin assembly comprising a cylindrical part defining an axially extending bore and engageable with the walls of the caliper and torque member recesses and a resilient member disposed within the cylindrical part bore to yieldably oppose radial contraction of the cylindrical part, and the pin assembly further including means to prevent withdrawal of the pin assembly from the matching axially extending recesses, characterized by said pin assembly means comprising a wire element extending outwardly from said resilient member to define opposite ends for said wire element, one of said wire element ends defining a flexible latch to permit said pin assembly to be inserted into said recesses, said flexible latch being deformable to fit within said recesses when said pin assembly is inserted into said recesses, and said flexible latch returning to its free state when said pin assembly is disposed in its operative position within said recesses whereby both of said wire element ends cooperate with either said caliper assembly or said torque member to yieldably prevent withdrawal of said pin assembly from said recesses.

2. the disc brake assembly of claim 1 in which said one wire element end includes a coiled portion yieldably opposing withdrawal of said pin assembly from said recesses when said one end is engaging either said torque member or said caliper assembly.

3. The disc brake assembly of claim 1 in which said wire element extends through said resilient member and said wire element includes a bent portion within said resilient member to substantially prevent rotation of said wire element relative to said resilient member.

4. The disc brake assembly of claim 1 in which said wire element other end includes a transversely extending leg portion and an arcuate leg portion extending integrally with said portion.

5. The disc brake assembly of claim 1 in which said wire element one end includes a coiled portion and a finger, said coiled portion being tortionally distorted when said one end is disposed within said recesses to provide for said finger to be pivoted to a position permittng said one end to be moved within said recesses.

* * * * *